(12) United States Patent
Ranganathan

(10) Patent No.: US 9,841,952 B2
(45) Date of Patent: Dec. 12, 2017

(54) SYSTEM AND METHOD FOR DYNAMICALLY COMPOSING AN INTEGRATED OPEN SOURCE STACK

(71) Applicant: Wipro Limited, Bangalore (IN)

(72) Inventor: Ramesh Ranganathan, Bangalore (IN)

(73) Assignee: WIPRO Limited, Bangalore (IN)

( * ) Notice: Subject to any disclaimer, the term of this patent is extended or adjusted under 35 U.S.C. 154(b) by 16 days.

(21) Appl. No.: 15/046,986

(22) Filed: Feb. 18, 2016

(65) Prior Publication Data
US 2017/0185382 A1    Jun. 29, 2017

(30) Foreign Application Priority Data

Dec. 29, 2015    (IN) .......................... 7045/CHE/2015

(51) Int. Cl.
| | | |
|---|---|---|
| G06F 9/44 | (2006.01) | |
| G06Q 10/06 | (2012.01) | |
| G06F 9/445 | (2006.01) | |
| G06Q 30/02 | (2012.01) | |

(52) U.S. Cl.
CPC .................. *G06F 8/20* (2013.01); *G06F 8/30* (2013.01); *G06F 8/60* (2013.01); *G06F 8/71* (2013.01); *G06Q 10/06* (2013.01); *G06Q 10/06311* (2013.01); *G06Q 30/0269* (2013.01); *G06Q 30/0278* (2013.01)

(58) Field of Classification Search
CPC ..... G06F 8/71; G06F 8/60; G06F 8/36; G06F 21/10; G06F 21/57; G06Q 10/06; G06Q 10/0631; G06C 30/0282; G06C 30/0269; G06C 30/0278
See application file for complete search history.

(56) References Cited

U.S. PATENT DOCUMENTS

| | | | |
|---|---|---|---|
| 8,589,306 B1* | 11/2013 | Morriss ................. | G06Q 10/06 705/1.1 |
| 2004/0225512 A1 | 11/2004 | Armes et al. | |
| 2006/0031227 A1 | 2/2006 | Cope et al. | |
| 2007/0250813 A1 | 10/2007 | Sanghvi et al. | |
| 2008/0052663 A1* | 2/2008 | Cope ....................... | G06F 21/10 717/101 |
| 2008/0154965 A1* | 6/2008 | Pedersen ................. | G06F 8/36 |

(Continued)

*Primary Examiner* — Lewis A Bullock, Jr.
*Assistant Examiner* — Tina Huynh
(74) *Attorney, Agent, or Firm* — Finnegan, Henderson, Farabow, Garrett & Dunner LLP

(57) ABSTRACT

System and method for dynamically composing an integrated open source stack are disclosed. In one embodiment, the method comprises generating a stack specification. The method further comprises extracting a list of products from an open source product repository based on the stack specification and determining a product strength value for each product present in the list of product. The method further comprises generating one or more stack options comprising at least one of the products based on the product strength value and determining a stack strength value for each of the one or more stack options based on the product strength value and the user requirements. The method further comprises selecting a stack from the one or more stack options as the integrated open source stack and composing the integrated open source stack based on at least one of product metadata, adaptor metadata, or product scripts.

20 Claims, 3 Drawing Sheets

(56) References Cited

U.S. PATENT DOCUMENTS

| | | | |
|---|---|---|---|
| 2008/0281904 A1* | 11/2008 | Conrad | G06Q 10/0631 |
| | | | 709/203 |
| 2014/0289159 A1* | 9/2014 | Das | G06Q 30/0282 |
| | | | 705/347 |
| 2015/0143328 A1* | 5/2015 | Cope | G06Q 10/063 |
| | | | 717/102 |

* cited by examiner

SYSTEM AND METHOD FOR DYNAMICALLY COMPOSING AN INTEGRATED OPEN SOURCE STACK

TECHNICAL FIELD

This disclosure relates generally to open source stacks and more particularly to a system and a method for dynamically composing an integrated open source stack.

BACKGROUND

These days many enterprises are adopting open source stacks comprising various products to bring-in agility and innovation as they are cost effective. However, the open source stacks also pose new challenges in front of the enterprises which are generally not encountered in proprietary software. These challenges may include multiple competing frameworks/products with different maturity levels, developers of these products may range from individuals to established product companies, varying levels of community ecosystem & commercial product support, and different license models of the products being assembled and their fitment to the intended end use of the stack being developed. While open source provides an ability to mix & match products to create a stack of choice, integrating & deploying these products is time consuming. These challenges increase decision time in product selection, slows down product adoption and increase the roll out time for open source stacks in an enterprise.

SUMMARY

In one embodiment, a method for dynamically composing an integrated open source stack is disclosed. The method comprises generating a stack specification based on user requirements and product information received from an open source product repository. The method further comprises extracting a list of products from the open source product repository based on the stack specification. The method further comprises determining a product strength value for each product present in the list of product based on strength parameters received from one or more data sources. The method further comprises generating one or more stack options comprising at least one of the products based on the product strength value. The method further comprises determining a stack strength value for each of the one or more stack options based on the product strength value and the user requirements. The method further comprises selecting a stack from the one or more stack options as the integrated open source stack based on the stack strength value and user input. The method further comprises composing the integrated open source stack based on at least one of product metadata, adaptor metadata, or product scripts. The product metadata and the adaptor metadata are extracted from the open source product repository and the product scripts are extracted from at least one code repository.

In another, embodiment, a system for dynamically composing an integrated open source stack is disclosed. The system includes at least one processors and a computer-readable medium. The computer-readable medium stores instructions that, when executed by the at least one processor, cause the at least one processor to perform operations comprising generating a stack specification based on user requirements and product information received from an open source product repository. The operations further comprise extracting a list of products from the open source product repository based on the stack specification. The operations further comprise determining a product strength value for each product present in the list of product based on strength parameters received from one or more data sources. The operations further comprise generating one or more stack options comprising at least one of the products based on the product strength value. The operations further comprise determining a stack strength value for each of the one or more stack options based on the product strength value and the user requirements. The operations further comprise selecting a stack from the one or more stack options as the integrated open source stack based on the stack strength value and user input. The operations further comprise composing the integrated open source stack based on at least one of product metadata, adaptor metadata, or product scripts. The product metadata and the adaptor metadata are extracted from the open source product repository and the product scripts are extracted from at least one code repository.

In another embodiment, a non-transitory computer-readable storage medium for dynamically composing an integrated open source stack is disclosed, which when executed by a computing device, cause the computing device to perform operations comprising generating a stack specification based on user requirements and product information received from an open source product repository. The operations further comprise extracting a list of products from the open source product repository based on the stack specification. The operations further comprise determining a product strength value for each product present in the list of product based on strength parameters received from one or more data sources. The operations further comprise generating one or more stack options comprising at least one of the products based on the product strength value. The operations further comprise determining a stack strength value for each of the one or more stack options based on the product strength value and the user requirements. The operations further comprise selecting a stack from the one or more stack options as the integrated open source stack based on the stack strength value and user input. The operations further comprise composing the integrated open source stack based on at least one of product metadata, adaptor metadata, or product scripts. The product metadata and the adaptor metadata are extracted from the open source product repository and the product scripts are extracted from at least one code repository.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
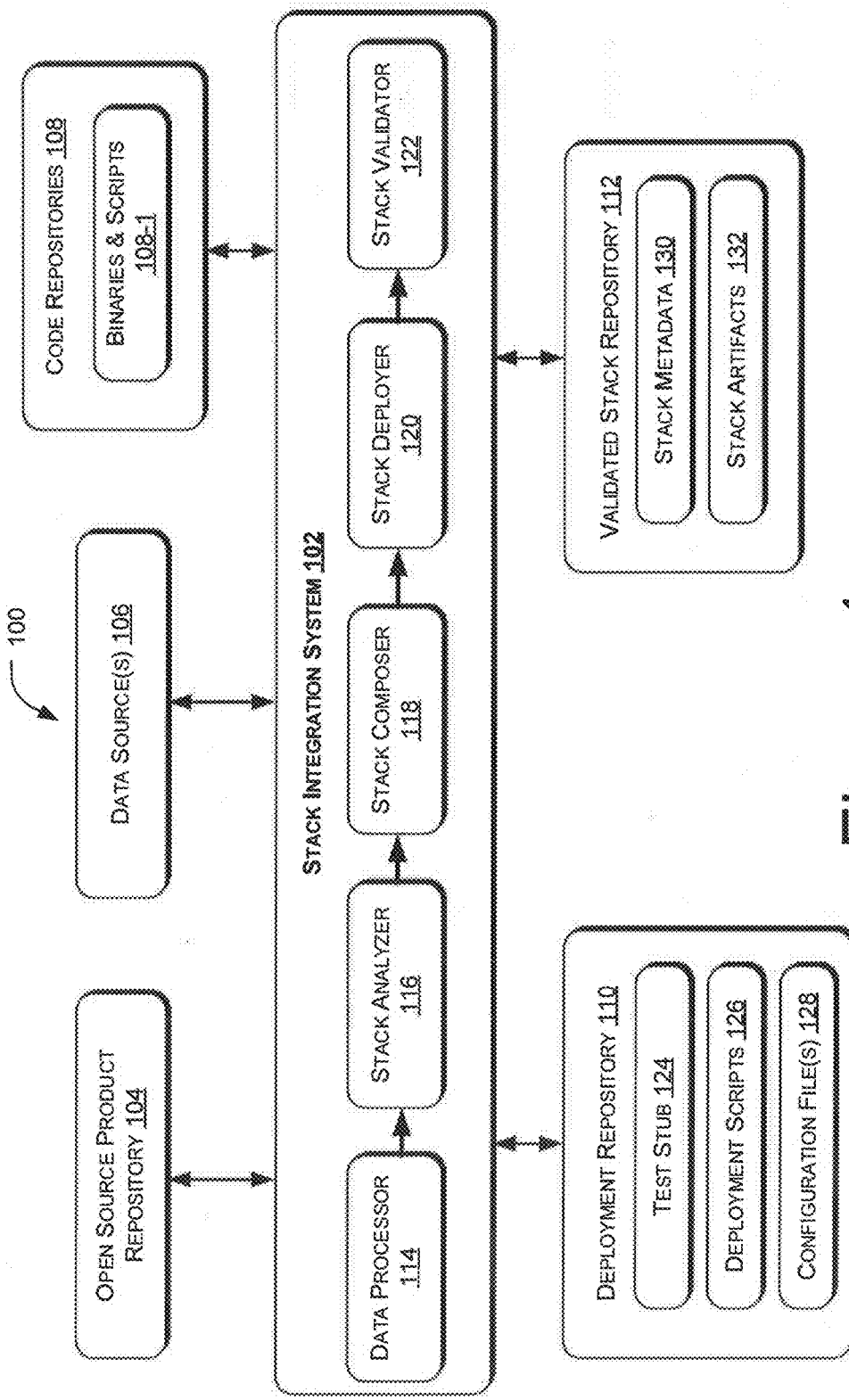
FIG. 1 illustrates an exemplary network implementation comprising a stack integration system, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The present subject matter discloses systems and methods for dynamically composing an integrated open source stack. In the present subject matter, to compose the integrated open source stack, a stack specification is generated based on requirements specified by a user. In an example, product information received from an open source product repository is also considered while generating the stack specification. Once the stack specification is generated, a list of products is extracted from the open source product repository. It may be noted that the list of products may comprise name and type of products that fulfil the requirements as specified by the user. Thereafter, for each product in the list of products, a product strength value may be determined based on strength parameters. Based on the product strength value, one or more products may be selected from the list of products to compose an open source stack. In an example, more than one open source stack with different combination of products may be offered to the user.

In case, where one or more stack options are given to the user, a stack strength value for each of the one or more stack options may be computed based on the product strength value of the products that are part of a stack option and the user requirements. Subsequently, a stack may be selected from the one or more stack options as the integrated open source stack to be provided to the user. Subsequently, for composing the integrated open source stack, product metadata and adapter metadata may be obtained from the open source product repository, binaries & product scripts may be extracted from the at least one code repository. The integrated open source stack may be provisioned by installing configuration files and base software on a virtual machine. In an example, the integrated open source stack may be validated based on license information and integration test cases received from the open source product repository.

Thus the present subject matter improves the agility in rolling out and adoption of open source platform in an enterprise by providing the ability to make informed decision on the stack components that will suite the enterprise need and also ensuring that stack can be quickly integrated to create the technical platform needed for implementing the business solution. The system and method of the present subject matter dynamically compose & deploy an integrated open source stack while also guiding the user on all possible options/implications before generating the stack.

Figure 2:
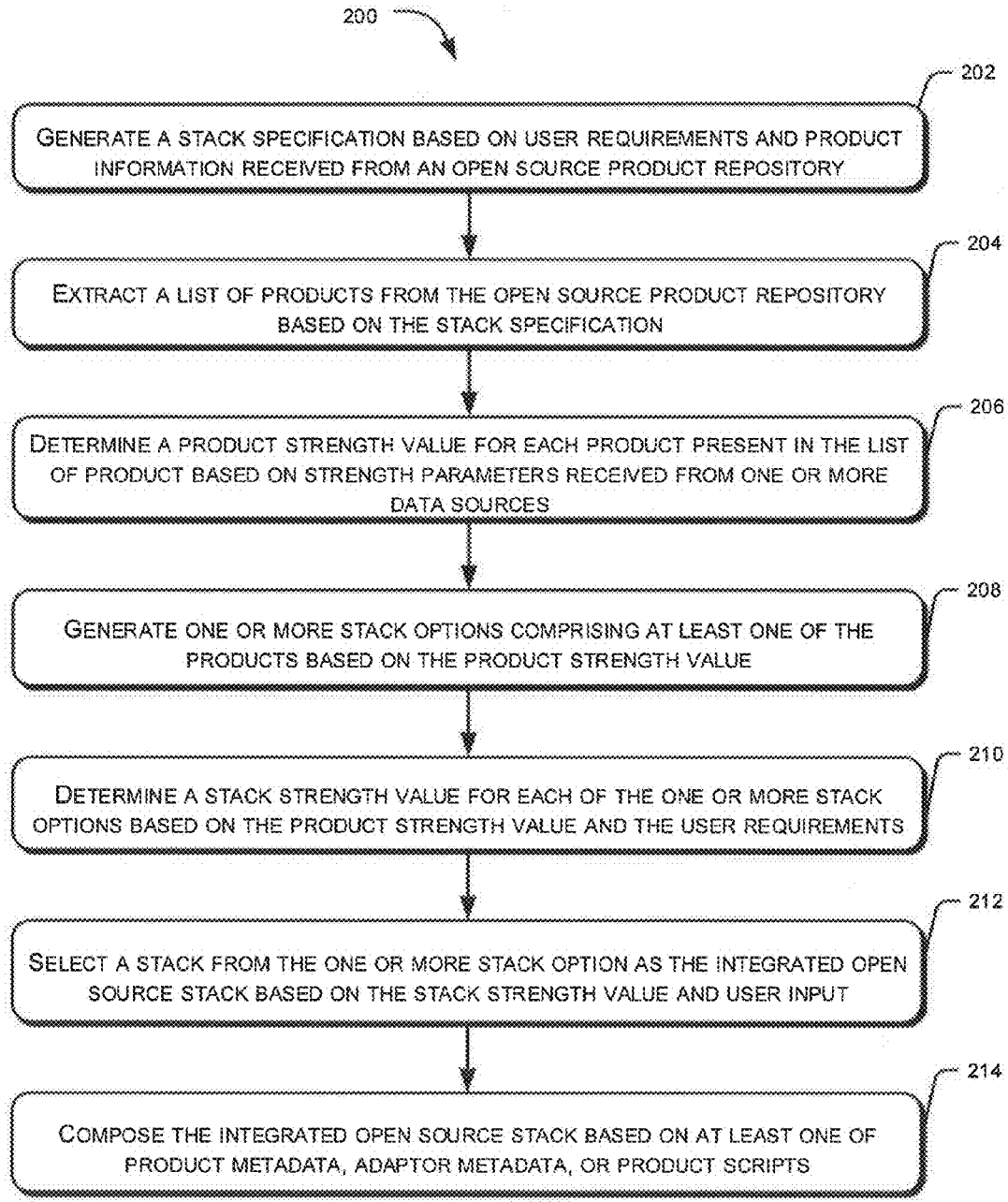
FIG. 2 illustrates an exemplary method for dynamically composing an integrated open source stack, in accordance with some embodiments of the present disclosure.
Figure 3:
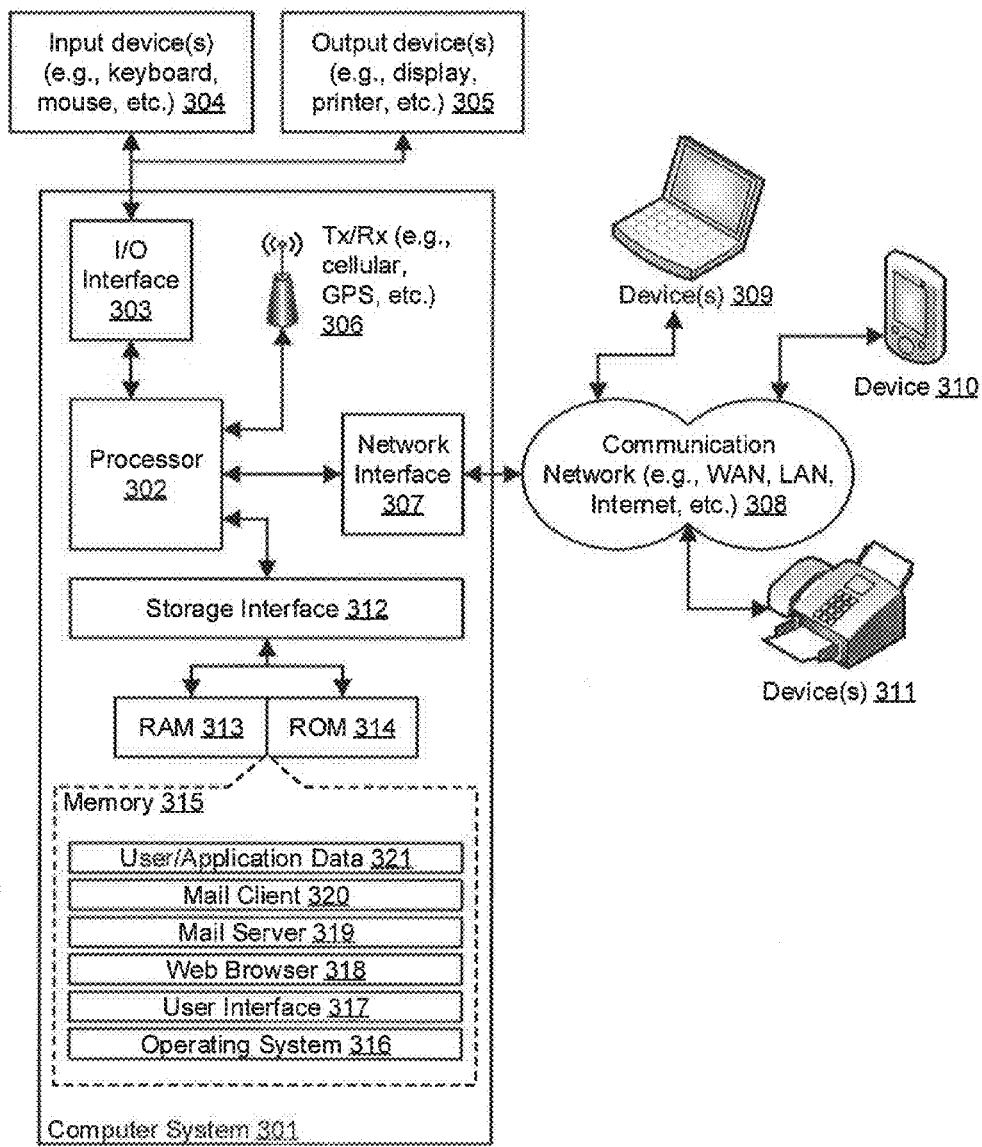
FIG. 3 is a block diagram of an exemplary computer system for implementing embodiments consistent with the present disclosure.

Working of the systems and methods dynamically composing an integrated open source stack is described in conjunction with FIGS. 1-3. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates an exemplary network environment 100 comprising a stack integration system 102, in accordance with some embodiments of the present disclosure.

As shown in FIG. 1, the stack integration system 102 is communicatively coupled to an open source product repository 104, data source(s) 106, code repositories 108, a deployment repository 110, and a validated stack repository 112. Although all the repositories are shown external to the stack integration system 102 in FIG. 1, it may be noted that, in one implementation, information residing in the repositories may be present within the stack integration system 102. For example, information, such as product information, product scripts, and metadata may be stored within the stack integration system 102. Hereinafter, the stack integration system 102 may be interchangeably referred to as system 102.

In an example, the stack integration system 102 may communicate to the open source product repository 104, the data source(s) 106, the code repositories 108, the deployment repository 110, and the validated stack repository 112 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

The system 102 may be implemented on variety of computing systems. Examples of the computing systems may include a laptop computer, a desktop computer, a tablet, a notebook, a workstation, a mainframe computer, a server, a network server, and the like. Although the description herein is with reference to certain computing systems, the systems and methods may be implemented in other computing systems, albeit with a few variations, as will be understood by a person skilled in the art.

As shown in FIG. 1, the system 102 comprises a data processor 114, a stack analyzer 116, a stack composer 118, a stack deployer 120, and a stack validator 122. In operations, to dynamically compose an integrated open source stack, the data processor 114 may generate a stack specification based on user requirements and product information received from the open source product repository 104. In an example, the user requirements comprise requirements specified by a user to get an open source stack comprising various products offering desired functionalities. The user requirements may include requirements specified by the user, functionalities of the software stack, and category of recommended products. In an example, the user requirements may just include functionalities of the software stack as requested by the user. Further, the data processor 114 may consider the product information while generating the stack specification based on the user requirements. The product information may include information, such as a product category, a license type, vendor support information, and download location of the product. In an example, the data processor 114 receives the product information from the open source product repository 104. In one example, the data processor 114 may create a schema of the software stack based on the user requirements. Thereafter, the data processor 114 may consider the schema of the software stack along with the product information while generating the stack specification.

The open source product repository 104 comprises metadata needed by the system 102 to determine possible stack combinations, decipher sources of public data for stack analysis and other information to deploy the open source stack. The open source product repository 104 also comprises information on open source products and adapters required to integrate the open source products. Further, the open source product repository 104 may be configured to have data import modules for one time data import, periodic synchronization component and APIs for the system 102 to inquire the catalogue. Hereinafter, the open source products may be interchangeably referred to as products.

Once the stack specification is generated, the data processor 114 may extract a list of products from the open source product repository 104 based on the stack specification. The data processor 114 may then extract information pertaining to products present in the list of products. In an example, the data processor 114 may extract information such as license information of the products, qualitative information related to the products and strength parameters of the products. The data processor 114 may extract this information from the data source(s) 106, such as public data repositories, online forums and community.

Thereafter, the data processor 114 may provide the information extracted from the data source(s) 106 to the stack analyzer 116. In an example, the stack analyzer 116 may determine a product strength value for each of the products present in the list of product based on the strength parameters received from the one or more data source(s) 106. The strength parameters may comprise number of contributors and committers, commercial support availability, community size, number of downloads, issues reported on software, frequency of releases, community activity, review of products on user forums version of product, and defects. The product strength value indicates suitability of the product as a part of the open source stack. In an example, the product strength value corresponding to each of the products may communicated to the user through a user device.

The stack analyzer 116 may generate one or more stack options comprising at least one of the products from the list of products based on the product strength value. In an example, the stack analyzer 116 selects various combination of the products based on the product strength value and assemble them to obtain the one or more stack options. Availability of the one or more stack options allows user to select an open source stack that meet the requirements specified by him/her.

Further, the stack analyzer 116 may determine a stack strength value for each of the one or more stack options based on the product strength value and the user requirements. The stack analyzer 116 may provide the one or more stack options to the user with detail information on the strengths of the products in the stack and the stack strength value for each of the one or more stack options to enable the user for taking an informed decision on the composition of the open source stack.

Table 1 illustrates an exemplary calculation of the stack strength value for a stack comprising two products, i.e., jBPM (Business Process Management) and Fuse (Enterprise Service Bus). As shown in the Table 1, various strength parameters are considered for calculating the product strength value for the jBPM and the fuse. Once the product strength is calculated for each of the products, the product strength values are aggregated to obtain the stack strength value which in turn enable the user to take an informative decision for selecting an open source stack amongst the one or more stack options.

TABLE 1

| Strength Parameters & Calculations | | | jBPM 6.2 | | | Fuse 6.2 | | |
|---|---|---|---|---|---|---|---|---|
| Area | Weightage | Calculation | Data | Score | Product Strength | Data | Score | Product Strength |
| Contribution Index | | | | | | | | |
| Total Contributors | 10% | Number of Contributors, Scale 1-100 | 285 | 2.85 | 0.285 | 54 | 0.54 | 0.054 |
| Contributor Growth | 5% | Increase/ Decrease in Contributors, Scale 1-100 | −1 | −0.01 | −0.0005 | −9 | −0.09 | −0.0045 |
| Forks & Stars | 5% | Number of Forks & Stars, Scale 1-100 | 412 stars, 583 forks | 4.975 | 0.24875 | 34 stars, 47 forks | 1.935 | 0.09675 |
| Tenure | 5% | Active | 10 | 10 | 0.5 | 4 | 4 | 0.2 |
| Commit Index | | | | | | | | |
| Total Commits | 10% | Total Commits, Scale 1-1000 | 40869 | 40.869 | 4.0869 | 7232 | 7.232 | 0.7232 |
| Commit | 5% | Increase/ | −2932 | −2.932 | −0.1466 | −662 | −0.662 | −0.0331 |

TABLE 1-continued

| Strength Parameters & Calculations | | | jBPM 6.2 | | | Fuse 6.2 | | |
|---|---|---|---|---|---|---|---|---|
| Area | Weightage | Calculation | Data | Score | Product Strength | Data | Score | Product Strength |
| Growth | | Decrease in Commits, Scale 1-100 | | | | | | |
| Software Release | 10% | Number of releases in 12 months (across CRs, Beta and Final Release) | 9 | 2.9 | 0.29 | 2 | 1 | 0.1 |
| Support Index | | | | | | | | |
| Vendor Support | 15% | Number of Vendors, 0-N | 1 | 1 | 0.15 | 1 | 1 | 0.15 |
| User Forums | 10% | Interaction in Forum (1 month), Scale 1-10 | 30 | 30 | 3 | 60 | 60 | 6 |
| Quality Index | | | | | | | | |
| Open Issues/tickets | 10% | Number of open Bugs, Scale 1-10 | 337 | −3.37 | −0.337 | 178 | −1.78 | −0.178 |
| Documentation | 5% | Level of comments, (0, 1, 2, 3) | 2 | 2 | 0.1 | 1 | 1 | 0.05 |
| Adaptors & Connectors | | | | | | | | |
| Number of Adaptors/Connectors | 10% | Support for Adaptors (JBPM-AM QP, MongoDB) (Fuse-SAP, AM QP) | 2 | 2 | 0.2 | 2 | 2 | 0.2 |
| Product index | | | | | 8.37655 | | | 7.35835 |
| Stack index | | | | | | | 15.7349 | |

Further, as shown in the Table 1, the stack analyzer 116 considers user discussions across various forums while calculating the product strength value. The stack analyzer 116 may feed the user discussions into an analytics engine to categorize the discussions in terms of issues, queries, positive or negative feedback. Also the responsiveness of the community to the questions, number of unanswered queries, unsatisfactory responses and time to respond may be analyzed by the stack analyzer 116 to provide qualitative feedback on the effectiveness of various community forums. The qualitative feedback may be then used for computing the product strength value.

In one implementation, once the stack strength value is determined for each of the one or more stack options, the stack analyzer 116 provides the stack strength value to the user through the user device. Thereafter, the stack analyzer 116 receives a user input indicating selection of a stack from the one or more stack options. The stack analyzer 116 may then consider the stack as the integrated open source stack to be composed based on the user input.

In another implementation, the stack analyzer 116 may receive the user input indicating preferences set by the user for the stack. Thereafter, the stack analyzer 116 may select a stack from the one or more stack options as the integrated opens source stack to be composed.

Further, the stack analyzer 116 may extract license information corresponding to the products present in integrated open source stack from the open source product repository 104. In an example, the stack analyzer 116 may extract licenses associated with the products from the license information. The stack analyzer 116 may then analyze the license to identify clauses relevant to the user based on the user requirements. These clauses may be then provided to the user so that he/she can take a call.

In another example, the stack analyzer 116 may validate the license of the products that are part of the integrated open source stack based on a compatibility factor. The stack analyzer 116 may determine the compatibility factor by comparing license clauses with the user requirements. In case, the license clauses are compatible with the user requirements, the stack analyzer 116 may validate the license and instruct the stack composer 118 to compose the integrated open source stack. On the other hand, in case, the license clauses are not compatible with the user requirements, the stack analyzer 116 may identify the clause that is not compatible with the user requirements and forward it to the user. Then the user may take a call whether to proceed with the current stack or not. The stack analyzer 116 may receive the user decision as a part of the user input.

It may be noted that the licenses of the products that are part of the integrated open source stack are validated herein. In one implementation, the licenses for the all the products present in the list of products may be validated before providing the one or more stack options to the user. In this manner, only the products having the validated licenses will be considered for generating the one or more stack options.

Further, once the integrated open source stack to be composed is identified, the stack composer 118 may compose the integrated open source stack by pulling out product metadata and adaptor metadata from the open source product repository 104 and product scripts from the code repositories 108. As shown in the FIG. 1, the code repositories 108 comprises binaries and scripts 108-1. It may be noted that the product scripts or scripts 108-1 may be understood as deployment scripts for an open source product. Hereinafter, the code repositories 108 may also be individually referred to as a code repository 108. In an example, the stack composer 118 may extract relevant binaries and scripts 108-1 from the code repositories 108 based on the product metadata obtained from the open source product repositories. Furthermore, the stack composer 118 may determine integration points by analyzing the stack specification and extract binaries for all adapters that are not bundled with the open source integrated stack.

Once the integrated open source stack is composed, the stack deployer 120 may dynamically update configuration files for each of the products in the integrated open source stack to reflect stack composition based on data available in the deployment repository 110. As shown in FIG. 1, the deployment repository 110 comprises test stub 124, deployment scripts 126, and configuration files 128. In an example, if certain configuration files are not available in the deployment repository 110, the stack deployer 120 may indicate a warning to the user and instruct to manually update the configuration file 128. Once the user provides the configuration file, the stack deployer 120 may update the configuration file 128 in the deployment repository 110 for future use. Similarly, in case the stack deployer 120 is unable to pull certain deployment scripts 126 due to metadata issues, the stack deployer 120 may instruct the user to update the deployment scripts 126 in the deployment repository 110.

Thereafter, the stack deployer 120 may provision the integrated open source stack by installing base software for the products on virtual machines based on the deployment scripts 126. In an example, the stack deployer 120 may install the base software on the virtual machines specified by the user. Further, the stack deployer 120 may also make post deployment changes to ensure that environment specific details, such as a location where database is running, are updated as appropriate. Thereafter, all the services offered by the integrated open source stack are started to enable testing.

In an example, the stack validator 122 may execute integration test cases to validate the integrated open source. The integration test cases are executed to ensure stack components are able to communicate and message is able to flow across products. The stack validator 122 determines test cases that are need for examining product dependencies and stack integration points. The stack validator 122 may extract the test stub 124 from the deployment repository 110. In an example, the test stub/scripts 124 can be combined to create a test suite for different stacks for future reuse in other stack combinations. In case, the stack validator 122 encounters a stack failure, any manual corrections made by the user to the configuration or binaries or test scripts is updated by the stack validator 122 into respective repositories for future reuse.

Subsequently, once the stack is validated, the stack validator 122 may update the integrated open source stack in the validated stack repository 112. In an example, the stack validator 122 updates metadata and artifacts corresponding to the integrated open source stack in stack metadata 130 and stack artifacts 132 respectively.

In this manner, the system 102 dynamically composes the integrated open source stack while also guiding the user on all possible options/implications and updates in the validated stack repository 112 for future reuse.

FIG. 2 illustrates an exemplary method for dynamically composing an integrated open source stack, in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to FIG. 2, at block 202, a stack specification is generated based on user requirements and product information received from the open source product repository 104. The stack specification indicates types of products and services that should be offered by an integrated stack. In an example, the data processor 114 receives the product information from the open source product repository 104 and the user information to generate the stack speciation. The product information may comprise a product category, a license type, vendor support information, and download location of the product. The user requirements may comprise schema of a software stack, functionalities of the software stack, and categories of recommended products.

At block 204, a list of products is extracted from the open source product repository 104 based on the stack specification. In an example, the data processor 114 may analyze the stack specification and extract the list of products from the open source product repository 104. The list of products may comprise name and category of products that can be used as a part of the integrated stack to offer services requested by the user in the user requirements.

Further, once the list of products is extracted, the data processor 114 may obtain information corresponding to the products present in the list of products from the open source product repository 104 and the data sources 106. In an example, the information may comprise strength parameters. The data processor 114 may then send the information to the stack analyzer 116 for further analysis.

At block 206, a product strength value for each product present in the list of product is determined based on the strength parameters received from one or more data sources 106. In an example, the stack analyzer 116 may analyze the strength parameters to compute the product strength value for each of the products present in the list of products. The strength parameters may comprise number of contributors and committers, commercial support availability, community size, number of downloads, issues reported on software, frequency of releases, community activity, review of products on user forums, version of product, and defects.

At block 208, one or more stack options comprising at least one of the products are generated based on the product strength value. In an example, the stack analyzer 116 may select some of the products from the list of products based on the product strength value for creating the one or more stack options for the user. In an example, if there are two products for offering same services, the stack analyzer 116 may select the product with the higher product strength value for generating the one or more stack options. In an example, the stack analyzer 116 may use various combination of the products and generate the one or more stack options to enable the user to select a stack, to be composed, from the one or more stack options.

At block 210, a stack strength value for each of the one or more stack options is determined based on the product strength value and the user requirements. In one example, the stack analyzer 116 may obtain the stack strength value for each of the stack options based on the product strength value of the products that are present in the one or more stack options. The stack analyzer 116 may also consider the user requirements while calculating the stack strength value. In another example, the stack analyzer 116 may determine the stack strength value for a stack option by aggregating the product strength value of each of the products present in that stack option, as illustrated in the Table 1.

At block 212, a stack from the one or more stack options is selected as the integrated open source stack based on the stack strength value and user input. In an example, the stack analyzer 116 may select the stack with the highest stack strength value amongst the one or more stack options as the integrated open source stack. In another example, the stack analyzer 116 may consider the stack strength value and the user input while selecting the stack from the one or more stack options. When a stack is selected as the integrated open source stack, it may indicate that selected stack will be composed and deployed once license requirements have been validated.

In an example, to validate the license, the stack analyzer 116 may obtain license information from the open source product repository 104 and extract licenses associated with the at least one of the products that are part of the integrated open source stack. Thereafter, the stack analyzer 116 may determine a compatibility factor between license and the user requirements by comparing license clauses with the user requirements. The stack analyzer 116 may then validate the integrated open source stack based on the compatibility factor. Once the licenses of the products present in the integrated open are validated, the stack analyzer 116 may instruct the stack composer 118 to compose the integrated open source stack.

At block 214, the integrated open source stack is composed based on at least one of product metadata, adaptor metadata, or product scripts. The product metadata and the adaptor metadata are extracted from the open source product repository 104 and the product scripts are extracted from the code repositories 108. In an example, the stack composer 118, to compose the integrated open source, may extracting the product metadata and the adaptor metadata from the open source product repository 104. Then the stack composer 118 may obtain the product scripts from the code repositories 108 based on the product metadata. In an example, the stack composer 118 may also determine integration points for composing the integrated open source stack. In this manner, by pulling out relevant scripts from the code repositories 108 and the adaptor metadata, the integrated open source stack is composed.

Once the integrated open source stack is composed, the stack deployer 120 may deploy the integrated open source stack to offer the services. To deploy the integrated open source stack, the stack deployer 120 may obtain the deployment scripts 126 and the configuration files 128 present in the deployment repository 110. Thereafter, the stack deployer 120 may dynamically update the configuration files 128 for the products present in the integrated open source stack. Subsequently, the stack deployer 120 may provision the integrated open source stack by installing base software for the products on virtual machines specified by the user. In an example, the base software to be installed is determined based on the deployment scripts 126. Once the integrated open source stack is deployed, all the services available may be started and tested to ensure that various products in the integrated open source stack are able to communicate and message is able to flow across the products.

To validate the integrated open source stack, the stack validator 122 may executing integration test cases on the integrated open source stack. In an example, the stack validator 122 determines test cases that are need for examining product dependencies and stack integration points. In case result of execution is successful, the integrated open source stack is updated in the validated stack repository 112 by the stack validator 122 for future use. On the other hand, in case, the stack validator 122 encounters a failure during testing, any manual corrections made by the user to the configuration or binaries or test scripts is updated by the stack validator 122 into respective repositories for future reuse.

Thus, the present subject matter discloses system and method for dynamically composing the integrated open source stack while also guiding the user on all possible options/implications before generating the stack. The present subject matter brings agility in rolling out and adoption of open source platform in an enterprise by providing the ability to make informed decision on the stack components that will suite the enterprise need. The system and method of the present subject matter ensure that stack can be quickly integrated to create the technical platform needed for implementing the business solution. Further, the present subject matter also consider license compliance while generating the integrated open source stack.

Computer System

FIG. 3 is a block diagram of an exemplary computer system for implementing embodiments consistent with the present disclosure. Variations of computer system 301 may be used for implementing the data processor 114, the stack analyzer 116, the stack composer 118, the stack deployer 120, and the stack validator 122 presented in this disclosure. Computer system 301 may comprise a central processing unit ("CPU" or "processor") 302. Processor 302 may comprise at least one data processor for executing program components for executing user- or system-generated requests. A user may be a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, AMA's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor. GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for dynamically composing an integrated open source stack. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for dynamically composing an integrated open source stack, the method comprising:
    generating, via a processor, a stack specification based on user requirements and product information received from an open source product repository;
    extracting, via the processor, a list of products from the open source product repository based on the stack specification;
    determining, via the processor, a product strength value for each product present in the list of products based on strength parameters received from one or more data sources; generating, via the processor, one or more stack options comprising at least one of the products based on the product strength value;
    determining, via the processor, a stack strength value for each of the one or more stack options based on the product strength value and the user requirements;
    selecting, via the processor, a stack from the one or more stack options as the integrated open source stack based on the stack strength value and user input; and
    composing, via the processor, the integrated open source stack based on at least one of product metadata, adaptor metadata, or product scripts, wherein the product metadata and the adaptor metadata are extracted from the open source product repository and the product scripts are extracted from at least one code repository, and wherein the composing comprises:
        determining stack integration points based on analysis of the stack specification, and
        extracting binaries of adapters that are not bundled with the integrated open source stack.

2. The method of claim 1, further comprising:
    dynamically updating configuration files for the products present in the integrated open source stack; and
    provisioning the integrated open source stack by installing base software for the products on virtual machines based on deployment scripts.

3. The method of claim 1, further comprising validating the integrated open source stack by executing integration test cases based on the stack integration points.

4. The method of claim 1, wherein selecting the stack from the one or more stacks as the integrated open source stack further comprises:
    extracting licenses associated with the at least one of the products from the open source product repository;
    validating the extracted licenses based on a compatibility factor, wherein the compatibility factor is determined based on comparing license clauses with the user requirements; and
    selecting the stack from the one or more stacks as the integrated open source stack based on the validation, the stack strength value and the user input.

5. The method of claim 1, wherein the product information comprises a product category, a license type, vendor support information, and download location of the product.

6. The method of claim 1, wherein the product strength value is determined by analyzing the strength parameters comprising number of contributors and committers, commercial support availability, community size, number of downloads, issues reported on software, frequency of releases, community activity, review of products on user forums, version of product, and defects.

7. The method of claim 1, wherein the user requirements comprises schema of a software stack, functionalities of the software stack, and categories of recommended products.

8. A system for dynamically composing an integrated open source stack, the system comprising: at least one processor; and a computer-readable medium storing instructions that, when executed by the at least one processor, cause the at least one processor to perform operations comprising:
    generating a stack specification based on user requirements and product information received from an open source product repository;
    extracting a list of products from the open source product repository based on the stack specification;
    determining a product strength value for each product present in the list of products based on strength parameters received from one or more data sources;
    generating one or more stack options comprising at least one of the products based on the product strength value;
    determining a stack strength value for each of the one or more stack options based on the product strength value and the user requirements;
    selecting a stack from the one or more stack options as the integrated open source stack based on the stack strength value and user input; and
    composing the integrated open source stack based on at least one of product metadata, adaptor metadata, or product scripts, wherein the product metadata and the adaptor metadata are extracted from the open source product repository and the product scripts are extracted from at least one code repository, and wherein the composing comprises:
  determining stack integration points based on analysis of the stack specification, and
  extracting binaries of adapters that are not bundled with the integrated open source stack.

9. The system of claim 8, wherein the operations further comprise:
  dynamically updating configuration files for the products present in the integrated open source stack; and
  provisioning the integrated open source stack by installing base software for the products on virtual machines based on deployment scripts.

10. The system of claim 8, wherein the operations further comprise validating the integrated open source stack by executing integration test cases based on the stack integration points.

11. The system of claim 8, wherein selecting the stack from the one or more stacks as the integrated open source stack further comprises:
  extracting licenses associated with the at least one of the products from the open source product repository;
  validating the extracted licenses based on a compatibility factor, wherein the compatibility factor is determined based on comparing license clauses with the user requirements; and
  selecting the stack from the one or more stacks as the integrated open source stack based on the validation, the stack strength value and the user input.

12. The system of claim 8, wherein the product information comprises a product category, a license type, vendor support information, and download location of the product.

13. The system of claim 8, wherein the product strength value is determined by analyzing the strength parameters comprising number of contributors and committers, commercial support availability, community size, number of downloads, issues reported on software, frequency of releases, community activity, review of products on user forums, version of product, and defects.

14. The system of claim 8, wherein the user requirements comprises schema of a software stack, functionalities of the software stack, and categories of recommended products.

15. A non-transitory computer-readable medium storing computer-executable instructions for performing operations comprising:
  generating a stack specification based on user requirements and product information received from an open source product repository;
  extracting a list of products from the open source product repository based on the stack specification;
  determining a product strength value for each product present in the list of products based on strength parameters received from one or more data sources;
  generating one or more stack options comprising at least one of the products based on the product strength value;
  determining a stack strength value for each of the one or more stack options based on the product strength value and the user requirements;
  selecting a stack from the one or more stack options as an integrated open source stack based on the stack strength value and user input; and
  composing the integrated open source stack based on at least one of product metadata, adaptor metadata, or product scripts, wherein the product metadata and the adaptor metadata are extracted from the open source product repository and the product scripts are extracted from at least one code repository, and wherein the composing comprises:
    determining stack integration points based on analysis of the stack specification, and
    extracting binaries of adapters that are not bundled with the integrated open source stack.

16. The medium of claim 15, wherein the operations further comprise:
  dynamically updating configuration files for the products present in the integrated open source stack; and
  provisioning the integrated open source stack by installing base software for products, present in the integrated open source stack, on virtual machines based on deployment scripts.

17. The medium of claim 15, comprise validating the integrated open source stack by executing integration test cases based on the stack integration points.

18. The medium of claim 15, wherein selecting the stack from the one or more stacks as the integrated open source stack further comprises:
  extracting licenses associated with the at least one of the products from the open source product repository;
  validating the extracted licenses based on a compatibility factor, wherein the compatibility factor is determined based on comparing license clauses with the user requirements; and
  selecting the stack from the one or more stacks as the integrated open source stack based on the validation, the stack strength value and the user input.

19. The medium of claim 15, wherein the product information comprises a product category, a license type, vendor support information, and download location of the product.

20. The medium of claim 15, wherein the product strength value is determined by analyzing the strength parameters comprising number of contributors and committers, commercial support availability, community size, number of downloads, issues reported on software, frequency of releases, community activity, review of products on user forums, version of product, and defects.

* * * * *